United States Patent [19]

Hasselbring

[11] Patent Number: 5,369,174
[45] Date of Patent: Nov. 29, 1994

[54] BLENDS FOR ENHANCING PROPERTIES OF VINYL AROMATIC-CONJUGATED DIENE BLOCK COPOLYMERS

[75] Inventor: Lori C. Hasselbring, Bartlesville, Okla.

[73] Assignee: Phillips Petroleum Company, Bartlesville, Okla.

[21] Appl. No.: 862,904

[22] Filed: Apr. 2, 1992

[51] Int. Cl.$^5$ .................. C08L 51/06; C08L 53/02
[52] U.S. Cl. .......................... 525/71; 525/74; 525/78; 525/89; 525/98
[58] Field of Search ............... 525/71, 70, 314, 74, 525/78, 240, 98, 95, 89, 207

[56] References Cited

U.S. PATENT DOCUMENTS

| | | | |
|---|---|---|---|
| 3,793,283 | 2/1974 | Frailey et al. | 525/98 |
| 4,198,327 | 4/1980 | Matsumoto et al. | 525/74 |
| 4,302,554 | 11/1981 | Nabeta et al. | 525/71 |
| 4,350,795 | 9/1982 | Bohm et al. | 525/87 |
| 4,386,187 | 5/1983 | Grancio et al. | 525/71 |
| 4,490,493 | 12/1984 | Mikols | 524/68 |
| 4,562,229 | 12/1985 | Walker et al. | 525/71 |
| 4,612,155 | 9/1986 | Wong et al. | 525/74 |
| 4,724,178 | 2/1988 | Hyodo et al. | 428/36 |
| 4,761,451 | 8/1988 | Moteki et al. | 525/98 |
| 4,880,878 | 11/1989 | Himes et al. | 525/314 |
| 4,957,974 | 9/1990 | Ilenda et al. | 525/71 |

FOREIGN PATENT DOCUMENTS

| | | |
|---|---|---|
| 0254346A3 | 1/1988 | European Pat. Off. . |
| 0254346A2 | 1/1988 | European Pat. Off. . |
| 0299499A3 | 1/1989 | European Pat. Off. . |
| 0299499A2 | 1/1989 | European Pat. Off. . |
| 0449086A1 | 2/1991 | European Pat. Off. . |

OTHER PUBLICATIONS

Derwent Publications Ltd., London, GB Accession No. 92-101616, Abstract of JP 4045140.
G. M. Swisher & R. D. Mathis, "A Close-up of Blends Based on Butadiene-Styrene Copolymer", *Plastics Eng.*, pp. 53–56 (Jun. 1984).
"Compatibilizers: The Secret 'Glue' Binding New Alloys," *Plastics Technology*, pp. 67–75 (Feb. 1989).

*Primary Examiner*—James J. Seidleck
*Assistant Examiner*—M. L. Warzel
*Attorney, Agent, or Firm*—Morrison Bennett

[57] ABSTRACT

Three resin blends are provided: (a) blends of monovinyl aromatic-conjugated diene block copolymers and grafted polypropylene; (b) blends of monovinyl aromatic-conjugated diene block copolymers, grafted polypropylene and styrene-ethylene/butylene-styrene rubbers; and (c) blends of monovinyl aromatic-conjugated diene block copolymer, polypropylene and styrene-ethylene/butylene-styrene rubbers. Methods of making these resins and articles made therefrom are provided.

7 Claims, No Drawings

BLENDS FOR ENHANCING PROPERTIES OF VINYL AROMATIC-CONJUGATED DIENE BLOCK COPOLYMERS

BACKGROUND OF THE INVENTION

This invention relates to blends of monovinyl aromatic-conjugated diene block copolymers.

Resinous monovinyl aromatic-conjugated diene block copolymers exhibit desirable properties such as clarity and the ability to toughen other plastics when used in blends.

However, there is a continuing need for resin blends which can be extruded into sheets or films or injection molded into articles having good impact strength, melt strength, resistance to delamination, good environmental stress crack resistance and economic feasibility. For some applications clarity is essential, and for others an aesthetically pleasing opaque appearance is desired.

SUMMARY OF THE INVENTION

It is an object of this invention to provide blends of monovinyl aromatic-conjugated diene block copolymers and grafted polypropylene polymers or copolymers which can be extruded or injection molded into articles having an excellent combination of desired appearance, good melt strength, good impact strength, good flexural modulus, and resistance to delamination.

It is another object of this invention to provide methods for making such compositions.

It is still another object of this invention to provide such compositions which can be readily prepared by melt extrusion.

It is yet another object of this invention to provide processes for making and using such compositions.

It is also an object of this invention to provide articles made from such compositions.

In accordance with one embodiment of this invention, resin blends which can be extruded or injection molded into articles having good impact strength and flexural modulus comprise:

(a) a monovinyl aromatic-conjugated diene block copolymer; and
(b) grafted polypropylene.

In accordance with another embodiment of this invention, resin blends which can be extruded or injection molded into articles having good impact strength and good flexural modulus comprise:

(a) a monovinyl aromatic-conjugated diene block copolymer;
(b) polypropylene;
(c) styrene-ethylene/butylene-styrene rubber.

In accordance with still another embodiment of this invention, resin blends which can be extruded or injection molded into articles having good impact strength and good flexural modulus comprise:

(a) a monovinyl aromatic-conjugated diene block copolymer;
(b) grafted polypropylene;
(c) styrene-ethylene/butylene-styrene rubber.

In accordance with yet another embodiment of this invention, a process is provided for preparing a composition comprising:

(a) a monovinyl aromatic-conjugated diene block copolymer;
(b) grafted polypropylene.

In accordance with another embodiment of this invention, a process is provided for preparing a composition comprising:

(a) a monovinyl aromatic-conjugated diene block copolymer;
(b) polypropylene; and
(c) a styrene-ethylene/butylene-styrene rubber.

In accordance with still another embodiment of this invention, a process is provided for preparing a composition comprising:

(a) a monovinyl aromatic-conjugated diene block copolymer;
(b) grafted polypropylene; and
(c) a styrene-ethylene/butylene-styrene rubber.

DETAILED DESCRIPTION OF THE INVENTION

Improvements in properties of extruded or molded articles made from monovinyl aromatic-conjugated diene block copolymers can be obtained by using various blends of resins to impart desired properties to the compositions.

The present invention is directed to a class of new and useful blends of monovinyl aromatic-conjugated diene block copolymers and grafted polypropylene. These blends can be extruded or injection molded into articles which have surprising and unexpectedly good impact strength, melt strength, flexural modulus, resistance to delamination and environmental stress crack resistance.

It has also been discovered that use of a minor amount of one or more styrene-ethylene/butylene-styrene rubbers in the blend of monovinyl aromatic-conjugated diene block copolymer and grafted polypropylene results in even better impact strength.

It has also been discovered that use of certain polypropylene random copolymers in blends with monovinyl aromatic-conjugated diene block copolymers exhibit impact strengths which are indicative of synergism in the blends.

Another useful and surprising discovery was that when a minor amount of styrene-ethylene/butylene-styrene rubber is added to a blend of monovinyl aromatic-conjugated diene block copolymer and polypropylene, the polypropylene need not be grafted to improve impact properties.

In one embodiment, the resin compositions of this invention more particularly comprise:

(a) from about 50 to about 90 weight percent, more preferably from about 60 to about 85 weight percent, and most preferably from about 65 to about 85 weight percent, based on total weight of polymer in the composition, of monovinyl aromatic-conjugated diene copolymer; and (b) from about 10 to about 50 weight percent, more preferably from about 15 to about 40 weight percent, and most preferably from about 15 to about 35 weight percent, based on total weight of polymer in the composition, of grafted polypropylene.

In another embodiment, the resin compositions of this invention more particularly comprise:

(a) from about 5 to about 98 weight percent, more preferably from about 20 to about 95 weight percent, and most preferably from about 65 to about 90 weight percent, based on total weight of polymer in the composition, of monovinyl aromatic-conjugated diene copolymer;

(b) from about 2 to about 95 weight percent, more preferably from about 5 to about 80 weight percent, and most preferably from about 10 to about 35 weight percent, based on total weight of polymer in the composition, polypropylene; and (c) from greater than 0 to about 20 weight percent, more preferably from about 1 to about 15 weight percent, and most preferably from about 5 to about 10 weight percent, based on total weight of polymer in the composition, of one or more styrene-ethylene/butylene-styrene rubbers.

In still another embodiment, the resin compositions of this invention more particularly comprise:

(a) from about 5 to about 98 weight percent, more preferably from about 20 to about 95 weight percent, and most preferably from about 65 to about 90 weight percent, based on total weight of the composition, of monovinyl aromatic-conjugated diene copolymer;

(b) from about 2 to about 95 weight percent, more preferably from about 5 to about 80 weight percent, and most preferably from about 10 to about 35 weight percent, based on total weight of the composition, of grafted polypropylene; and (c) from greater than 0 to about 20 weight percent, more preferably from about 1 to about 15 weight percent, and most preferably from about 5 to about 10 weight percent, based on total weight of the composition, of a styrene-ethylene/butylene-styrene rubber.

Optionally the compositions of this invention may contain additional additives.

Monovinyl Aromatic-Conjugated Diene Block Copolymers

The monovinyl aromatic-conjugated diene block copolymers useful in this invention include, but are not limited to, such block copolymers as the types AB, ABA, tapered AB and ABA and radial (star block) copolymers, where A represents a polymerized monovinyl aromatic compound, usually styrene, and B represents a polymerized conjugated diene, usually 1,3-butadiene. Sufficient block monovinyl aromatic compound must be present to insure compatibility with the styrene resin (at least about 20 weight percent and more preferably at least 50 weight percent of the block copolymer). The rubbery block could be polybutadiene, a random or tapered styrene/butadiene copolymer or polyisoprene or random or tapered styrene-isoprene copolymer. Presently preferred is butadiene and/or isoprene.

The polymodal styrene-butadiene block copolymers having a Shore D hardness as measured by ASTM D 2240-86 of about 60 or higher, more preferably from about 64 to about 80, are presently preferred. These copolymers, having resinous properties, contain from about 50 to about 95 weight percent polymerized styrene, more preferably from about 65 to about 85 weight percent, and most preferably from about 70 to 80 weight percent polymerized styrene, based on total weight of the copolymer. They are prepared so that at least a portion of the final product is of a coupled character, linear or branched or both linear and branched. These polymodal block copolymers can be prepared by sequential charge copolymerization such as, for example, that described in U.S. Pat. No. 4,584,346, which is hereby incorporated herein by reference.

Propylene

Any of the normally solid substantially crystalline polymers of propylene (polypropylene) can be employed in this invention. The term "polypropylene" is intended to include normally solid polypropylene homopolymers which are substantially crystalline, isotactic, or syndiotactic in form, and copolymers of propylene having a comonomer content of copolymerized ethylene, butene, or other 1-olefin ($\alpha$-olefin) up to as much as about 5 mole percent.

Presently preferred are the normally solid substantially crystalline polypropylenes having a nominal melt flow in the range of about 0.5 to about 50 g/10 min., preferably about 1 to about 25 g/10 min., and presently more preferably about 1 to about 8 g/10 min., as determined by ASTM D 1238-88 Condition 230/2.16.

The polypropylenes employed can be utilized in any convenient form such as pellets from a finishing extruder, as a fluff as obtained from a polymerization recovery step, or as a powder.

Examples of commercially available polypropylenes which can be used in this invention include, but are not limited to, the Marlex ® polypropylenes having flow rates ranging from 1 to 8 g/10 min., including homopolymers and copolymers, available from Phillips Petroleum Company.

Commercially available polypropylenes normally have stabilizers and antioxidants added to minimize molecular weight change during melt processing.

A sufficient amount of polypropylene to achieve the desired properties in articles made from the invention blends should be used. Use of too little polypropylene would result in loss of the desired marblescent appearance and economic advantage.

Use of polypropylene or a polypropylene copolymer which has been grafted is presently preferred in the blends of monovinyl aromatic-conjugated diene block copolymer and polypropylene when clarity and transparency are desired. Grafted polypropylene can also be used in ternary blends of monovinyl aromatic-conjugated diene block copolymer, polypropylene and styrene-ethylene/butylene-styrene rubber to obtain improvement in properties such as Izod impact.

The presently preferred grafting compound is a carboxylic acid or an anhydride thereof, with about three to about 10 carbon atoms, with preferably at least one olefinic unsaturation, and derivatives thereof. Examples of the carboxylic acid and anhydride include, but are not limited to, an unsaturated monocarboxylic acid such as acrylic acid or methacrylic acid; an unsaturated dicarboxylic acid such as maleic acid, fumaric acid, itsconic acid, citraconic acid, allyl succinic acid, muconic acid (mesaconic acid), glutaconic acid, norbornene-2,3-dicarboxylic acid (tradename Nadic acid), methyl Nadic acid, tetrahydrophthalic acid, or methylhexahydrophthalic acid; an unsaturated dicarboxylic anhydride such as maleic anhydride, itaconic anhydride, citraconic anhydride, allyl succinic anhydride, glutaconic anhydride, norbornene-2,3-dicarboxylic anhydride (also known by the tradename Nadic anhydride), methyl Nadic anhydride, tetrahydrophthalic anhydride, or methyltetrahydrophthalic anhydride; or a mixture of two or more thereof. Of these unsaturated carboxylic acids and acid anhydrides thereof, maleic acid, maleic anhydride, muconic acid, Nadic acid, methyl Nadic acid, methyl Nadic anhydride, or Nadic anhydride is preferably used.

The radically polymerizable unsaturated grafting compound is present in the reaction mixture in an amount sufficient to improve the properties of the resultant grafted polymer. Usually, the amount is in the range of about 0.1 to about 2 parts of radically polymerizable unsaturated grafting compound per 100 parts of polymer (phr), preferably in the range of about 0.2 to about 1.6 phr, and most preferably in the range of about 0.4 to about 1.2 phr. If too much grafting compound is used, not all of the grafting compound will be grafted onto the polymer and no additional appreciable polymer property improvement is obtained; an excess is economically undesirable. Use of too little grafting compound does not improve or enhance the polymer properties. In general, the grafting compounds used in this invention have similar amounts of functionality.

The grafting reaction must occur in the presence of a free radical generator, also called a free radical initiator. An organic peroxide is preferably used as the free radical initiator in the graft modification reaction as described above. More specifically, preferred examples of an organic peroxide include, but are not limited to, alkyl peroxides, aryl peroxides, acyl peroxides, aroyl peroxides, ketone peroxides, peroxycarbonates, peroxycarboxylates, hydroperoxides, and other organic peroxides. Examples of an alkyl peroxide include diisopropyl peroxide; di-tert-butyl peroxide; 2,5-dimethyl-2,5-di-(tert-butylperoxy)hexyne-3; α,α'-bis(tert-butylperoxy)-diisopropyl benzene; and 2,5-dimethyl-2,5-di-(tert-butylperoxy)hexane. An example of an aryl peroxide is dicumyl peroxide. An example of an acyl peroxide is dilauroyl peroxide. An example of an aroyl peroxide is dibenzoyl peroxide. Examples of a ketone peroxide include methyl ethyl ketone peroxide and cyclohexanone peroxide. Examples of hydroperoxide include tert-butyl hydroperoxide and cumene hydroperoxide. Preferred examples of a free radical initiator are di-tert-butyl peroxide; 2,5-dimethyl-2,5-di(tert-butylperoxy)-hexyne-3; 2,5- dimethyl-2,5-di(tert-butylperoxy)hexane, dicumyl peroxide; α,α'-bis(tert-butylperoxy)diisopropylbenzene; and mixtures thereof. Higher molecular weight organic peroxide compounds are preferred because they are safer and easier to handle and store, as well as being more stable at higher temperatures.

The organic peroxide is present in the grafting reaction in an amount sufficient to effectuate a grafting reaction. Usually, the amount is in the range of about 0.001 to about 5 parts of organic peroxide per 100 parts polypropylene polymer (phr), preferably in the range of about 0.001 to about 1 phr, and most preferably in the range of about 0.005 to about 0.4 phr. Too much organic peroxide can still initiate the grafting reaction, but polymer degradation, such as vis-breaking of the polypropylene polymer, can occur. A concentration of organic peroxide which is too low does not initiate the grafting reaction.

The grafting can be done by any effective means, including those disclosed in U.S. Pat. No. 4,003,874, which is hereby incorporated herein by reference.

The grafting reaction must occur in the polymer melt. Thus, the temperature of the reaction is in the range from about the polymer melting point to about the polymer decomposition temperature. Preferably, the reaction temperature is in the range from about 20° C. above the polymer melting point to about the decomposition temperature of the polymer. Most preferably, the lower end of the temperature range is utilized to minimize any thermal degradation effects to the polymer.

The carboxylated polypropylene may, if desired, be neutralized or partially neutralized. This is usually done with a metal ion, such as $Na^+$, $Zn^{++}$, or the like, to form an ionomer.

The time required for the grafting reaction is a length sufficient for the grafting to occur. Usually, the time is in the range of about 10 seconds to about 30 hours, preferably in the range of from about 15 seconds to about 3 hours. Most preferably, the reaction time is in the range of from about 30 seconds to about 10 minutes. Shorter times, such as less than 5 minutes, are preferred to minimize thermal degradation effects to the polymer.

The grafting reaction can be carried out by either batch or continuous processes, provided that all components are well dispersed and well blended. A continuous process is preferred for ease of operation. One example of a continuous process is to add the polymer(s), stabilizer(s), grafting compound(s), and free radical generator(s) to an extruder. The order of addition of the components is not critical. For example, all components can be dry mixed and then extruded. If preferred, the reactants can be added sequentially wherein, for example, the grafting reaction occurs first, and additional stabilizer(s) is added downstream from the extruder.

Pregrafted polypropylenes which may be used in the blends of this invention are commercially available. One such carboxylated polypropylene is produced by Himont U.S.A., Inc.., of Wilmington, Del., and marketed under the trade designation of Pro-fax PC-072 Polypropylene. Another carboxylated polypropylene is produced by E. I. DuPont de Nemours and Company of Wilmington, Del., under the trade designation of FUSABOND ® P. These products are believed to be graft polymers of polypropylene and maleic anhydride. The amount of maleic anhydride functionality is believed to be less than 2% by weight. Another carboxylated polypropylene is produced by BP Performance Polymers, Inc., of Hackettstown, N.J., and marketed under the trade designation of Polybond ®. These products are believed to be graft polymers of polypropylene and acrylic acid. The amount of acrylic acid functionality is believed to be about 6% by weight.

Styrene/ethylene-butylene/Styrene Rubber

The styrene-ethylene/butylene-styrene rubbers useful in this invention are styrenic thermoplastic elastomers with stable, completely saturated ethylene-butylene mid-segments. The styrene-ethylene/butylene-styrene rubbers are linear triblock copolymers or mixtures of linear diblock and triblock copolymers. The styrene-ethylene/butylene-styrene rubbers useful in this invention generally have styrene/rubber ratios ranging from about 10/90 to about 35/65.

Styrene-ethylene/butylene-styrene rubbers in the form of powder, crumbs or pellets may be used.

Additives

The blends of this composition may contain certain other additives to plasticize, improve processability, extend, reinforce, fill, lubricate, prevent oxidation, flame retard, dye, pigment, etc., the polymeric composition. Such additives are well known in the art and may be incorporated without departing from the scope of the invention. The amount of additives may vary widely according to the additive, and/or its form, and/or its concentration.

Blend Compositions

The blend compositions of this invention are summarized in the following Table 1.

TABLE 1

Ranges of Amounts of Components Present in Invention Blends

| Component | Broad Range[a] | Intermediate Range[a] | Narrow Range[a] |
|---|---|---|---|
| Embodiment I | | | |
| monovinyl aromatic-conjugated diene block copolymer | 50–90 | 60–85 | 65–85 |
| grafted polypropylene | 10–50 | 15–40 | 15–35 |
| other additives[b] | >0–20 | | |
| Embodiment II | | | |
| monovinyl aromatic-conjugated diene block copolymer | 5–98 | 20–95 | 65–90 |
| polypropylene | 2–95 | 5–80 | 10–35 |
| styrene/ethylene-butylene/styrene | >0–20 | 1–15 | 5–10 |
| other additives[b] | >0–20 | | |
| Embodiment III | | | |
| monovinyl aromatic-conjugated diene block copolymer | 5–98 | 20–95 | 65–90 |
| grafted polypropylene | 2–95 | 5–80 | 10–35 |
| styrene/ethylene-butylene/styrene | >0–20 | 1–15 | 5–10 |
| other additives[b] | >0–20 | | |

[a]Amounts are weight percents based on total weight of the polymers.
[b]Optional ingredients.

The relative amounts of the three polymer components will vary according to the relative priority given objectives such as economic advantage, processability and performance.

Preparation

The blends of this invention can be prepared by any suitable means, including blending and tumbling. Examples of these methods include, but are not limited to, dry mixing in the form of a powder, wet mixing in the form of a solution or slurry, and melt extrusion compounding.

The monovinyl aromatic-conjugated diene block copolymer, polypropylene or grafted polypropylene, and/or styrene-ethylene/butylene-styrene rubber, and any other additional additives, may be mechanically blended together in the desired proportions with the aid of any suitable mixing device conveniently used for mixing rubbers or plastics, such as, for example, a differential roll mill, a Banbury mixer, or an extruder.

In these types of methods, the monovinyl aromatic-conjugated diene block copolymer, polypropylene or grafted polypropylene, and/or styrene-ethylene/butylene-styrene rubber, and any other components, reinforcement material, filler and additives used, can be in any form, such as, for example, fluff, powder, granulate, pellet, solution, slurry, and/or emulsion. Any additive can be combined with the polymers according to any method known in the art. Examples of incorporation methods include, but are not limited to, dry mixing in the form of a powder and wet mixing in the form of a solution or slurry.

Melt extrusion compounding can be carried out using any suitable method such as in single screw or twin screw extruders or other melt extruders at temperatures above the melting point of the polymers.

The presently preferred method comprises blending the polymers in powder or granular form, extruding the blend, chopping into pellets and final processing (such as injection molding or sheet extrusion).

In order to facilitate thorough mixing of the polymers and to develop the desired combination of physical properties, the mechanical blending is carried out at a sufficiently high temperature to soften the polymers so that they are thoroughly dispersed and intermingled with each other. Usually the block copolymer, which characteristically is the higher softening material of the composition, will govern the mixing temperature selected. Generally, temperatures in the range of about 350° F. to about 450° F. would be used. Mixing is continued until an essentially uniform blend is obtained.

Alternatively the block copolymer, polypropylene or grafted polypropylene, and/or styrene-ethylene/butylene-styrene rubber, may be solution blended using one or more suitable solvents.

Preferably the polypropylene is grafted prior to blending with the monovinyl aromatic-conjugated diene block copolymer, styrene-ethylene/butylene-styrene rubber when used, and other additives. For example, grafted dry polypropylene can be dry mixed in any suitable blender or tumbling means with the monovinyl aromatic-conjugated diene block copolymer, styrene-ethylene/butylene-styrene rubber when used, and other components and the resulting mixture then melt-extruded.

Another method of preparation provides for grafting the polypropylene in situ by melt extrusion of polypropylene, grafting agents (such as maleic anhydride or acrylic acid and a small amount of peroxide). Block copolymer and styrene-ethylene/butylene-styrene rubber can be added to an extruder at the same time. However, pregrafting of the polypropylene is preferred for optimum mechanical properties.

The monovinyl aromatic-conjugated diene and polypropylene blends of this invention can be made into consumer products and housewares having an attractive swirling pattern or marblescent appearance. Articles made from the monovinyl aromatic-conjugated diene and polypropylene blends of this invention have excellent flexural modulus and tensile impact strength. Use of polypropylene in blends with monovinyl aromatic-conjugated diene resins have obvious economic advantages.

Similarly, when grafted polypropylene is used in blends with a monovinyl aromatic-conjugated diene, the resultant resin can be made into consumer products and housewares having an attractive pearlescent and high gloss appearance. Recycling of articles made from blends using grafting polypropylene is simplified because the grafting agent acts as a compatibilizer which results in resins which can be made into articles that can more readily be processed in the post-consumer recycle stream.

When articles having greater impact strength are desired, the ternary blends of this invention are useful. The ternary blends with a minor amount of styrene-ethylene/butylene-styrene rubber and grafted polypropylene can be used for making attractive articles with greater impact strength. The ternary blends using ungrafted polypropylene have an even greater economic advantage than those with grafted polypropylene and are useful where a swirling pattern or marblescent appearance is desired.

The following examples will be used to describe the invention and should be taken as illustrative and not restrictive.

EXAMPLES

In the following examples, the resinous styrene-butadiene copolymer is KR03 grade K-Resin ® polymer, a product of Phillips Petroleum Company. This copolymer contains about 75 weight percent styrene and about 25 weight percent butadiene. KR03, designated SB in the examples, is a polymodal molecular weight distribution copolymer before coupling and has a nominal flow rate of 8 g/10 min. The SB polymer contains a low level of a coupling agent.

Polypropylene homopolymers used in the examples are products of Phillips Petroleum Company. A polypropylene copolymer from Phillips Petroleum Company contained 2-3 wt % ethylene and had a nominal flow rate of 2 g/10 min. This copolymer is designated PP-1 in the examples. Each of these polypropylene polymers was received as fluff (powder) and was stabilized before further processing with 0.06 wt % Irganox ® 1010 (Ciba-Geigy), 0.1 wt % Ultranox ® 626 (GE Chemicals), 0.05 wt % DHT-4A (Mitsui & Co.), and 0.075 wt % sodium benzoate.

Several grafted polypropylene samples were also used in the examples. Grafting agents used were maleic anhydride (MAH) and acrylic acid (AA). The grafted polypropylenes used in these examples are described in Table 2 below with the designations used in the examples. All samples were in pellet form. The experimental, grafted polypropylene was prepared by mixing PP-1 with 1 wt % maleic anhydride and 0.1 wt. % peroxide (Vul-Cup ® R, Hercules, Inc.), and extruding the mixture.

TABLE 2

Grafted Polypropylenes Used in the Examples

| Polypropylene | Grafting Agent (wt %) | Designation |
|---|---|---|
| PC-072[a] | maleic anhydride (<2) | PP-g-1 |
| PB-1011[b,c] | acrylic acid (6) | PP-g-2 |
| PB-1003[c,d] | acrylic acid (6) | PP-g-3 |
| Experimental | maleic anhydride (1) | PP-g-4 |
| Hercoprime ® G[e] | maleic anhydride | PP-g-5 |

[a]Himont U.S.A., Inc.
[b]Block copolymer.
[c]Polybond ®, BP Performance Polymers.
[d]Homopolymer.
[e]Hercules, Inc.

These grafted polypropylenes are somewhat hygroscopic and must be kept dry. If they become moist, they can be dried by heating in an oven for a few hours at about 105° C.

Several styrene-ethylene/butylene-styrene (SEBS) block copolymers from Shell Chemical were used in the examples. These are described below with designations used in the examples. All chemicals were in pellet form.

TABLE 3

Styrene-ethylene/butylene-styrene Rubbers Used in the Examples

| Kraton ® Designation | Styrene/ Rubber Ratio | Diblock/ Triblock Ratio | Designation |
|---|---|---|---|
| G1652 | 29/71 | 0/100 | SEBS-1 |
| G1657X | 13/87 | 35/65 | SEBS-2 |
| G1726X | 30/70 | 70/30 | SEBS-3 |
| FG1901X[a] | 28/72 | | SEBS-4 |

[a]Grafted with 2 wt % maleic anhydride.

Unless otherwise stated, all blends in the examples were dry mixed and then melt extruded on a Werner & Pfleiderer ZSK-30 twin-screw extruder using an open vent and a 210° C. barrel temperature. Injection molding was done on either New Britain or Arburg injection molders using barrel temperatures of 210° C. and mold temperatures of 38° C. A test specimen mold was used to provide samples for the physical testing. Comparative tests showed that similar test results were obtained on both injection molding units.

The following test methods were used in the examples.

TABLE 4

Test Procedures Used

| Property | ASTM Method |
|---|---|
| Flow rate, g/10 min Condition 200/5.0 for SB Condition 230/2.16 for PP | D 1238-88 |
| Tensile strength at break, MPa | D 638-89 at 50 mm/min |
| Elongation, % | D 638-89 at 50 mm/min |
| Flexural modulus, MPa | D 790-86 |
| Izod impact strength, notched, J/m | D 256-88 |
| Vicat softening point, °C. | D 1525-87 |

EXAMPLE I

A series of blends of KR03 resinous styrene-butadiene copolymer with polypropylene samples was prepared to demonstrate the effect of various polypropylenes on the Izod impact values of the resinous styrene-butadiene copolymer SB. A range of compositions from all polypropylene to all SB were prepared. Four homopolymers with flow rates between 1 and 8 g/10 minutes and one polypropylene copolymer (PP-1) were used. The blends were extruded, injection molded, and tested.

An examination of the Izod impact properties of the blends (Table 5) shows that there was some enhancement of the impact values at specific polypropylene levels in some cases. The copolymer PP-1 provided an enhancement of the Izod at 25 and 10 wt % polypropylene. However, polypropylene homopolymers with flow rates between 1 and 8 g/10 minutes caused little change in the impact values. All SB/PP blends were clearly incompatible by their pearlescent appearance and delamination during tensile testing.

TABLE 5

Izod Impact of Polymer Blends Using Polypropylenes with Varying Melt Flows

| | Ratio of Polymers in Blend | | | | | |
|---|---|---|---|---|---|---|
| SB[a], wt % | 0 | 10 | 25 | 50 | 75 | 90 | 100 |
| PP[b], wt % | 100 | 90 | 75 | 50 | 25 | 10 | 0 |
| Izod Impact (notched), J/m | | | | | | | |
| PP Homopolymer | | | | | | | |
| 1 g/10 min melt flow | 32 | 75 | 53 | 85 | 117 | [c] | 16 |
| 2 g/10 min melt flow | 21 | 75 | 53 | 75 | [c] | 27 | 16 |
| 5 g/10 min melt flow | 16 | 37 | 32 | 37 | 523 | 27 | 16 |
| 8 g/10 min melt flow | 16 | 27 | 32 | 21 | 64 | 27 | 16 |
| PP Copolymer | | | | | | | |
| 2 g/10 min melt flow | 59 | 107 | 96 | 53 | 544 | 544 | 21 |

[a]KR03 K-Resin ® block copolymer
[b]Polypropylene listed below
[c]Variable results

EXAMPLE II

This example describes the use of grafted polypropylenes to improve the impact properties of a resinous styrene-butadiene copolymer. Two series of samples with varying ratios from all polypropylene to all SB were prepared from maleic anhydride grafted (PP-g-1) and acrylic acid grafted (PP-g-2) polypropylenes. These blends were melt extruded, injection molded, and tested.

The notched Izod impact test results (Table 6) showed that blends containing PP-g-1 had increased Izod impact values (compared with the individual polymers) over the entire blend range and had a sharply increased value at the 25 wt % level. Blends containing 25 and 50 wt % PP-g-2 had very large Izod impact values. These blends also exhibited increased tensile strength (at break) and elongation values. As determined by the lack of pearlescence and delamination, the compatibility of the blends improved compared with blends made from non-grafted polypropylene.

TABLE 6

Properties of Various Polymer Blend Ratios

| | Blend Ratios | | | | | | |
|---|---|---|---|---|---|---|---|
| SB[a], wt % | 0 | 10 | 25 | 50 | 75 | 90 | 100 |
| PP[b], wt % | 100 | 90 | 75 | 50 | 25 | 10 | 0 |
| | Properties | | | | | | |
| PP-g-1[c] | | | | | | | |
| Tensile strength, MPa | 17 | 14 | 7.6 | 25 | 30 | 28 | 24 |
| Elongation, % | 388 | 198 | 346 | 287 | 327 | 296 | 236 |
| Izod impact (notched), J/m | 27 | 37 | 43 | 64 | 566 | 32 | 16 |
| PP-g-2[d] | | | | | | | |
| Tensile strength, MPa | 15 | 15 | 16 | 15 | 25 | 25 | 23 |
| Elongation, % | 70 | 46 | 28 | 88 | 360 | 271 | 243 |
| Izod impact, (notched), J/m | 165 | 101 | 107 | 571 | 646 | 32 | 21 |

[a]KR03 K-Resin ® block copolymer.
[b]Specific grafted polypropylene listed below as PP-g-1 or PP-g-2.
[c]PC-072 polypropylene grafted with maleic anhydride available from Himont U.S.A., Inc.
[d]Polybond ® 1011 block copolymer grafted with acrylic acid available from BP Performance Polymers.

EXAMPLE III

The effect of several styrene-ethylene/butylene-styrene (SEBS) rubbers on the physical properties of a blend of a resinous styrene-butadiene copolymer and a polypropylene is demonstrated in this example. A series of 50/50 wt ratio blends of SB and PP-1 with an additional 10 wt % of a SEBS were prepared. Sample 1 is a comparative sample made without any added SEBS. The blends were extruded, injection molded, and tested.

Table 7 shows the composition and physical properties of the blends. Invention blends 2 through 5 had sharply increased impact values compared with comparative sample 1. Blends 2 through 5 remained pearlescent, indicating that the SEBS rubbers did not change the compatibility of the blends significantly.

TABLE 7

Effect of Various Styrene-Ethylene/Butylene-Styrene Rubbers in Polymer Blends

| Sample Number[a] | 1 | 2 | 3 | 4 | 5 |
|---|---|---|---|---|---|
| Rubber Used | | | | | |
| SEBS-1, wt %[b] | 0 | 10 | 0 | 0 | 0 |
| SEBS-2, wt %[b] | 0 | 0 | 10 | 0 | 0 |
| SEBS-3, wt %[b] | 0 | 0 | 0 | 10 | 0 |
| SEBS-4, wt %[b] | 0 | 0 | 0 | 0 | 10 |
| Properties | | | | | |
| Izod impact (notched), J/m | 101 | 913 | 742 | 689 | 779 |
| Tensile Strength, MPa | 37 | 34 | 37 | 16 | 40 |

TABLE 7-continued

Effect of Various Styrene-Ethylene/Butylene-Styrene Rubbers in Polymer Blends

| Sample Number[a] | 1 | 2 | 3 | 4 | 5 |
|---|---|---|---|---|---|
| Elongation, % | 483 | 857 | 564 | 471 | 602 |

[a]Base resin is 50/50 by weight mixture of SB (KR03 K-Resin ® polymer) and PP-1 (polypropylene copolymer).
[b]Wt % based on total base resin weight.
SEBS-1 = Kraton ® G1652
SEBS-2 = Kraton ® G1657X
SEBS-3 = Kraton ® G1726X
SEBS-4 = Kraton ® FG1901X

EXAMPLE IV

This example demonstrates the improvement of the Izod impact properties of a blend of a resinous styrene-butadiene copolymer with a polypropylene that is grafted in-situ and a SEBS rubber. Each blend was a 50/50 by weight mixture of SB and PP-1. Runs 6 through 9 also contained 10 wt % of a SEBS rubber along with the maleic anhydride (MAH) and a peroxide (Vul-Cup ® R) for the in-situ grafting. Comparative run 10 did not include the SEBS rubber.

The SEBS rubbers increased the Izod impact of the blend (Table 8). In runs 8 and 9, the blends also had higher tensile break values. All blends were compatible with a lack of pearlescence and delamination.

TABLE 8

Effect of Various Styrene-Ethylene/Butylene-Styrene Rubbers in 50/50 Styrene-Butadiene Copolymer/Grafted Polypropylene Blends[a]

| Sample Number[a] | 6 | 7 | 8 | 9 | 10 |
|---|---|---|---|---|---|
| Rubbers and Grafting Agents | | | | | |
| SEBS-1[b], wt % | 10 | 0 | 0 | 0 | 0 |
| SEBS-2[b], wt % | 0 | 10 | 0 | 0 | 0 |
| SEBS-3[b], wt % | 0 | 0 | 10 | 0 | 0 |
| SEBS-4[b], wt % | 0 | 0 | 0 | 10 | 0 |
| Maleic anhydride, wt %[b] | 1 | 1 | 1 | 1 | 1 |
| Vul-Cup ® R, wt %[b] | 0.1 | 0.1 | 0.1 | 0.1 | 0.1 |
| Properties | | | | | |
| Izod Impact (notched), J/m | 726 | 795 | 278 | 753 | 48 |
| Tensile Strength, MPa | 32 | 25 | 127 | 119 | 30 |
| Elongation, % | 561 | 559 | 293 | 622 | 461 |

[a]Propylene grafted in situ.
[a]Base resin is 50/50 by weight mixture of SB (KR03 K-Resin ® polymer) and PP-1 (polypropylene copolymer).
[b]Wt % based on total base resin weight.
SEBS-1 = Kraton ® G1652
SEBS-2 = Kraton ® G1657X
SEBS-3 = Kraton ® G1726X
SEBS-4 = Kraton ® FG1901X

EXAMPLE V

The influence of several SEBS rubbers on a 50/50 by weight mixture of a resinous styrene-butadiene copolymer (SB) and a maleic anhydride grafted polypropylene (Himont PC-072) is demonstrated by this example. Sample 11 was a comparative example without the added SEBS rubber. Blends 12, 1.3, and 14 contained 10 wt % of a SEBS rubber based on the weight of the base blend.

As shown in Table 9, the three SEBS rubbers (Kraton ® G1657X, G1726X, FG1901X) in blends 12, 13, and 14 at the 10 wt % level with a grafted polypropylene produced increases in the Izod impact and elongation of the blends compared with the comparative blend 11. The Vicar softening point was decreased slightly by the addition of the SEBS. Compatibility of the base blend was unchanged by the added SEBS rubbers.

TABLE 9

| | Polymer Blends | | | |
|---|---|---|---|---|
| Sample Number[a] | 11 | 12 | 13 | 14 |
| Rubbers Used | | | | |
| SEBS-2, wt %[b] | 0 | 10 | 0 | 0 |
| SEBS-3, wt %[b] | 0 | 0 | 10 | 0 |
| SEBS-4, wt %[b] | 0 | 0 | 0 | 10 |
| Properties | | | | |
| Izod Impact (notched), J/m | 48 | 582 | 432 | 582 |
| Elongation, % | 231 | 357 | 295 | 654 |
| Vicat Softening Point, °C. | 109 | 102 | 99 | 104 |

[a]Base resin is 50/50 by weight mixture of SB (KR03 K-Resin) and PP-g-1 (Himont PC-072).
[b]Wt % based on base resin weight.
SEBS-2 = Kraton ® G1657X
SEBS-3 = Kraton ® G1726X
SEBS-4 = Kraton ® FG1901X

EXAMPLE VI

Several additional examples of the effect of SEBS rubbers on 50/50 by weight mixtures of a resinous styrene-butadiene copolymer and two acrylic acid grafted polypropylenes (PP-g-2, Polybond ® 1011 and PP-g-3, Polybond ® 1003) are presented in this example. Blends 15 and 18 are comparative blends containing no added SEBS rubber.

The testing results (Table 10) showed that blends 16 and 17 with PP-g-2 exhibited an increase in Izod impact with the added SEBS rubbers compared with blend 15 without the SEBS. Blends 19 and 20 with PP-g-3 had large increases in the Izod impact values over the comparative run 18 without a SEBS additive. The added SEBS reduced the flexural modulus of the blends, while the tensile strengths were mixed (some increased and some decreased).

TABLE 10

| | Polymer Blends | | | | | |
|---|---|---|---|---|---|---|
| Sample Number | 15 | 16 | 17 | 18 | 19 | 20 |
| Components | | | | | | |
| SB[a], wt % | 50 | 50 | 50 | 50 | 50 | 50 |
| PP-g-2[b], wt % | 50 | 50 | 50 | 0 | 0 | 0 |
| PP-g-3[c], wt % | 0 | 0 | 0 | 50 | 50 | 50 |
| SEBS-2, wt %[d] | 0 | 10 | 0 | 0 | 10 | 0 |
| SEBS-3, wt %[d] | 0 | 0 | 10 | 0 | 0 | 10 |
| Properties | | | | | | |
| Izod impact (notched), J/m | 603 | 710 | 705 | 53 | 635 | 560 |
| Tensile Strength, MPa | 15 | 19 | 13 | 24 | 33 | 15 |
| Elongation, % | 78 | 421 | 74 | 304 | 602 | 366 |
| Flexural Modulus, MPa | 900 | 540 | 640 | 1380 | 1010 | 1100 |

[a]KR03 K-Resin ® block copolymer
[b]Polybond ® 1011
[c]Polybond ® 1003
[d]Wt % based on total base resin (SB plus grafted PP).
SEBS-2 = Kraton ® G1657X
SEBS-3 = Kraton ® G1726X

EXAMPLE VII

This example demonstrates the effect of variations in the SEBS level on the impact strength of a 50/50 by weight mixture of a resinous styrene-butadiene copolymer and a maleic anhydride grafted polypropylene (Himont PC-072). Blends with SEBS-4 (Kraton ® FG1901X) levels ranging from 0 in sample 21 to 50 wt % in sample 24 based on the weight of the base resin mixture were prepared and tested.

The testing results are shown in Table 11. Increased Izod impact values were noted at 10, 25 and 50 wt % SEBS-4. However, the flexural modulus decreased as the level of SEBS-4 increased. The tensile strength was little changed and the elongation increased with increasing SEBS-4 levels.

TABLE 11

| | Polymer Blends | | | |
|---|---|---|---|---|
| Sample Number[a] | 21 | 22 | 23 | 24 |
| Rubber | | | | |
| SEBS-4, wt %[b] | 0 | 10 | 25 | 50 |
| Properties | | | | |
| Izod Impact (notched), J/m | 70 | 672 | 715 | 672 |
| Tensile Strength, MPa | 29 | 30 | 43 | 38 |
| Elongation, % | 289 | 349 | 661 | 651 |
| Flexural Modulus, MPa | 1040 | 850 | 660 | 468 |

[a]Base resin is 50/50 mixture of SB (KR03 K-Resin ®) and PP-g-1 (Himont PC-072).
[b]Wt % SEBS added based on base resin weight.
SEBS-4 = Kraton ® FG1901X

EXAMPLE VIII

A series of blends was prepared with a wide range of ratios of a resinous styrene-butadiene copolymer and a polypropylene with and without a SEBS rubber additive to demonstrate the dramatic effect of the SEBS on the blend impact properties. A 2 g/10 min flow rate polypropylene copolymer was used with copolymer SB. SEBS-1 (Kraton ® G1652) was added at the 10 wt % level based on the weight of the base resin mixture.

As described in Table 12, the presence of 10 wt % SEBS-1 provided a significant increase in Izod impact values over those of a corresponding sample without the SEBS-1 over the entire range of base resin ratios. The flexural modulus decreased with the addition of SEBS-1.

TABLE 12

| | Polymer Blends | | | | | | | |
|---|---|---|---|---|---|---|---|---|
| Sample Number | 25 | 26 | 27 | 28 | 29 | 30 | 31 | 32 |
| Components | | | | | | | | |
| SB, wt % | 10 | 10 | 25 | 25 | 75 | 75 | 90 | 90 |
| PP,[a] wt % | 90 | 90 | 75 | 75 | 25 | 25 | 10 | 10 |
| SEBS-1, wt %[b] | 0 | 10 | 0 | 10 | 0 | 10 | 0 | 10 |
| Properties | | | | | | | | |
| Izod Impact (notched), J/m | 75 | 566 | 80 | 544 | 165 | 646 | 32 | 560 |
| Tensile Strength, MPa | 25 | 28 | 23 | 25 | 28 | 26 | 27 | 19 |
| Elongation, % | 80 | 129 | 214 | 297 | 301 | 288 | 274 | 184 |
| Flexural Modulus, MPa | 1010 | 730 | 940 | 700 | 960 | 810 | 1100 | 980 |

[a]Stabilized 2 g/10 min flow rate PP.
[b]Wt % based on weight of SB (KR03 K-Resin ®) and PP.
SEBS-1 = Kraton ® G1652

EXAMPLE IX

A series of blends similar to that described in Example VIII was prepared using a maleic anhydride grafted polypropylene with the resinous styrene-butadiene copolymer. The grafted polypropylene was prepared by mixing a stabilized polypropylene fluff with 1 wt % maleic anhydride and 0.1 wt % Vul-Cup ® R and extruding the mixture. The amounts of SB in the blends ranged from 10 wt % to 90 wt %. SEBS-1 (Kraton ® G1652) was added at the 10 wt % level based on the base polymer blend weight.

Increases in Izod impact were noted (Table 13) in all samples with SEBS-1 compared with blends made without the SEBS-1. The largest increases in Izod impact were at 75 and 90 wt % SB.

TABLE 13

| Sample Number | Polymer Blends | | | | | | | |
|---|---|---|---|---|---|---|---|---|
| | 33 | 34 | 35 | 36 | 37 | 38 | 39 | 40 |
| Components | | | | | | | | |
| SB, wt % | 10 | 10 | 25 | 25 | 75 | 75 | 90 | 90 |
| PP, wt %[a] | 90 | 90 | 75 | 75 | 25 | 25 | 10 | 10 |
| SEBS-1, wt %[b] | 0 | 10 | 0 | 10 | 0 | 10 | 0 | 10 |
| Properties | | | | | | | | |
| Izod Impact (notched), J/m | 16 | 37 | 21 | 69 | 59 | 614 | 27 | 550 |
| Tensile Strength, MPa | 16 | 30 | 23 | 28 | 24 | 22 | 25 | 22 |
| Elongation, % | 588 | 981 | 27 | 791 | 400 | 360 | 222 | 2.3 |
| Flexural Modulus, MPa | 847 | 723 | 785 | 661 | 902 | 758 | 1080 | 1000 |

[a]Maleic anhydride grafted PP.
[b]Wt % based on weight of SB (KR03 K-Resin ®) and PP.
SEBS-1 = Kraton ® G1652

EXAMPLE X

This example demonstrates that not all added polymers result in an increase in Izod impact for a blend of a resinous styrene-butadiene copolymer and a maleic anhydride grafted polypropylene. To a base resin of 50/50 wt % SB and PP-g-4 was added different levels of Monsanto Lustran SAN 31 styrene-acrylonitrile (SAN) copolymer or Polystar NAS 20 styrene-methyl methacrylate (SMMA) copolymer.

No increase in Izod impact was observed (Table 14) with 1, 5, or 20 wt % SAN or SMMA over values for the the base resin blend 41.

TABLE 14

| Sample Number[a] | Polymer Blends | | | | | | |
|---|---|---|---|---|---|---|---|
| | 41 | 42 | 43 | 44 | 45 | 46 | 47 |
| SAN, wt %[b] | 0 | 1 | 5 | 20 | 0 | 0 | 0 |
| SMMA, wt %[b] | 0 | 0 | 0 | 0 | 1 | 5 | 20 |
| Izod Impact (notched), J/m | 43 | 32 | 32 | 21 | 43 | 43 | 37 |

[a]Base resin is 50/50 mixture of SB (KR03 K-Resin ®) and PP-g-4.
[b]Wt % added polymer based on base resin.
SAN = Lustran SAN 31
SMMA = Polystar NAS 20

EXAMPLE XI

Another series of blends was prepared to further demonstrate that other types of polymers are less effective than the invention polymers in improving the Izod impact values of a blend of resinous styrene-butadiene (SB) copolymer and a grafted polypropylene. The base resin was a 50/50 blend of SB and PP-g-4. The two added copolymers were Reseda GP-100 and Reseda GP-200 from Toagosei Chemicals. GP-100 is an acidified polyacrylate/polymethyl methacrylate copolymer with a melting point of 160°–170° C. and a flow rate of 3 g/10 min at Condition 200/2.16. GP-200 is a polystyrene/polymethyl methacrylate copolymer with a melting point of 120°–130° C. and a flow rate of 4 g/10 min at Condition 200/2.16.

The Izod impact results in Table 15 showed that at levels of 1, 5, and 20 wt %, neither GP-100 or GP-200 increased the impact values compared with the comparative blend 41 in Example X and Table 14.

TABLE 15

| Sample Number[a] | Polymer Blends | | | | | |
|---|---|---|---|---|---|---|
| | 48 | 49 | 50 | 51 | 52 | 53 |
| GP-100[b], wt % | 1 | 5 | 20 | 0 | 0 | 0 |
| GP-200[c], wt % | 0 | 0 | 0 | 1 | 5 | 20 |
| Izod Impact (notched), J/m | 37 | 37 | 32 | 37 | 32 | 32 |

[a]Base resin is 50/50 blend of SB (KR03 K-Resin ®) and PP-g-4. Added polymers GP-100, GP-200 are wt % based on weight of base resin.
[b]Reseda GP-100.
[c]Reseda GP-200.

EXAMPLE XII

This example demonstrates that SEBS provides only modest improvements in the Izod impact properties of blends of a resinous styrene-butadiene copolymer (SB) with a grafted polypropylene polymer that have a blend melt viscosity significantly lower than the melt viscosity of the SB copolymer. Base resin 54 is a 50/50 by weight blend of SB and PP-g-5 (Hercoprime G). Three SEBS rubbers were added at the 10 wt % level based on the base resin weight.

As shown in Table 16, the three added SEBS rubbers, blends 55, 56, and 57 produced only modest increases in the Izod impact values compared with blend 54. A viscosity scan of the base resin blend by a capillary rheometer showed that the viscosity over a wide range of frequencies was much lower than that of the styrene-butadiene copolymer or other blends of SB and grafted polypropylenes.

TABLE 16

| Sample Number[a] | Polymer Blends | | | |
|---|---|---|---|---|
| | 54 | 55 | 56 | 57 |
| SEBS-2, wt %[b] | 0 | 10 | 0 | 0 |
| SEBS-3, wt %[b] | 0 | 0 | 10 | 0 |
| SEBS-4, wt %[b] | 0 | 0 | 0 | 10 |
| Izod Impact (notched), J/m | 11 | 53 | 21 | 48 |

[a]Base resin is a 50/50 by weight mixture of SB (KR03 K-Resin ®) and PP-g-5 (Hercoprime ® G).
[b]Wt % based on weight base resin.
SEBS-2 = Kraton G1657X
SEBS-3 = Kraton G1726X
SEBS-4 = Kraton FG1901X

EXAMPLE XIII

Several other blends were prepared to show that the impact properties of blends of a resinous styrene-butadiene copolymer and a polypropylene copolymer are not improved by maleic anhydride without a peroxide or with an excess (0.5 wt %) of peroxide. The base resin is a 50/50 weight ratio of SB and PP-1. Blend 58 is a control resin with no additives. Two blends involve the addition of only the maleic anhydride (blend 59) or only the peroxide (blend 61). Two blends were prepared with a pretreatment of the polypropylene with either maleic anhydride alone (blend 60) or a mixture of maleic anhydride and 0.5 wt % of the peroxide (blend 63).

As described in Table 17, the maleic anhydride alone, peroxide alone, or maleic anhydride with an excess of peroxide provided little change in the impact values compared with the base resin 58. Attempted pregrafting was not successful in providing significant increases in impact strength due to either no peroxide (blend 60) or too much peroxide (blend 63).

TABLE 17

| Sample Number[a] | Polymer Blends | | | | | |
|---|---|---|---|---|---|---|
| | 58 | 59 | 60 | 61 | 62 | 63 |
| Maleic anhydride, wt %[b] | 0 | 1 | 1 | 0 | 1 | 1 |
| Vul-Cup ®, wt %[b] | 0 | 0 | 0 | 0.5 | 0.5 | 0.5 |
| Pregraft | No | No | Yes | No | No | Yes |
| Izod Impact (notched), J/m | 128 | 133 | 139 | 43 | 27 | 80 |

[a]Base resin is a 50/50 blend of SB (KR03 K-Resin) and PP-1.
[b]Wt % based on base resin weight.

While the compositions, processes and articles of manufacture of this invention have been described in detail for the purpose of illustration, the inventive compositions, processes and articles are not to be construed as limited thereby. This patent is intended to cover all changes and modifications within the spirit and scope thereof.

That which is claimed is:

1. A composition comprising (a) resinous styrene-butadiene block copolymer containing from about 50 to about 95 weight percent styrene, based on the total weight of said block copolymer; (b) grafted polypropylene which is a polypropylene having been grafted with a grafting agent selected from the group consisting of carboxylic acids, anhydrides of carboxylic acids, and mixtures thereof; and (c) styrene-ethylene/butylene-styrene rubber.

2. A composition as recited in claim 1 wherein said grafted polypropylene is a copolymer of polypropylene and ethylene.

3. A composition as recited in claim 1 wherein said styrene-ethylene/butylene-styrene rubber is present in an amount sufficient to improve the impact strength of a blend of said styrene-butadiene block copolymer and said grafted polypropylene.

4. A composition as recited in claim 1 wherein said styrene-butadiene block copolymer is present in an amount in the range of about 5 to about 98 weight percent, based on the total weight of said composition;
wherein said grafted polypropylene is present in an amount in the range of about 2 to about 95 weight percent, based on the total weight of said composition; and
wherein said styrene-ethylene/butylene-styrene rubber is present in an amount in the range from greater than 0 to about 20 weight percent, based on the total weight of said composition.

5. A composition as recited in claim 1 wherein said styrene-butadiene block copolymer is present in an amount in the range of about 20 to about 95 weight percent, based on the total weight of said composition;
wherein said grafted polypropylene is present in an amount in the range of about 5 to about 80 weight percent, based on the total weight of said composition; and
wherein said styrene-ethylene/butylene-styrene rubber is present in an amount in the range of about 1 to about 15 weight percent, based on the total weight of said composition.

6. A composition as recited in claim 1 wherein said styrene-butadiene block copolymer is present in an amount in the range of about 65 to about 90 weight percent, based on the total weight of said composition;
wherein said grafted polypropylene is present in an amount in the range of about 10 to about 35 weight percent, based on the total weight of said composition; and
wherein said styrene-ethylene/butylene-styrene rubber is present in an amount in the range of about 5 to about 10 weight percent, based on total weight of said composition.

7. Articles made from the composition of claim 1.

* * * * *

UNITED STATES PATENT AND TRADEMARK OFFICE
CERTIFICATE OF CORRECTION

PATENT NO. : 5,369,174

DATED : November 29, 1994

INVENTOR(S) : Lori C. Hasselbring

It is certified that error appears in the above-identified patent and that said Letters Patent is hereby corrected as shown below:

Claim 1, column 17, line 22, insert --- polymerized --- between "percent" and "styrene"

Signed and Sealed this

Twenty-first Day of February, 1995

Attest:

BRUCE LEHMAN

*Attesting Officer*  *Commissioner of Patents and Trademarks*